United States Patent [19]

Cutter

[11] Patent Number: 4,590,703
[45] Date of Patent: May 27, 1986

[54] ANIMAL TRAP

[76] Inventor: Jack Cutter, 10 Sleepy Hollow La., Orinda, Calif. 94563

[21] Appl. No.: 744,221

[22] Filed: Jun. 13, 1985

[51] Int. Cl.⁴ .............................................. A01M 23/00
[52] U.S. Cl. ........................................... 43/61; 43/60
[58] Field of Search .................................... 43/60, 61

[56] References Cited

U.S. PATENT DOCUMENTS

| | | | |
|---|---|---|---|
| 2,564,491 | 8/1951 | Martin | 43/60 |
| 2,574,780 | 11/1951 | Giacoletto | 43/61 |
| 2,594,855 | 4/1952 | Bloodgood | 43/61 |
| 2,813,369 | 11/1957 | Thomisee | 43/61 |
| 3,823,504 | 7/1974 | Dosch | 43/61 |

*Primary Examiner*—Nicholas P. Godici
*Assistant Examiner*—Carmine Cuda
*Attorney, Agent, or Firm*—Harris Zimmerman; Howard Cohen

[57] ABSTRACT

A trap for animals in which an inlet door is adapted to close when the animal enters the trap enclosure. The trap will confine and restrain the animal within the enclosure until an exit door or barrier is opened by the captor. A time release is provided by utilizing an edible or chewable member which constitutes a further release barrier which keeps the animal restrained until the animal gnaws, eats or chews his way through the same, thereby giving the captor time to remove himself from the location where the trap is placed with the animal therein.

10 Claims, 7 Drawing Figures

U.S. Patent   May 27, 1986   4,590,703
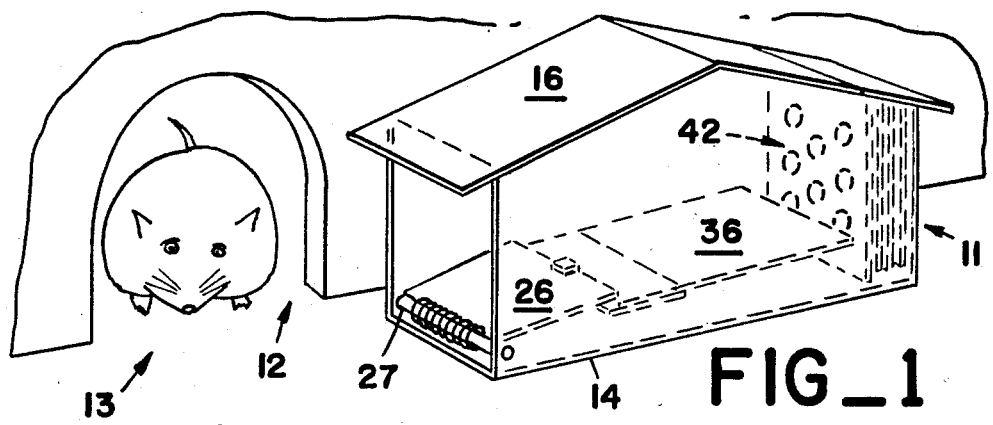
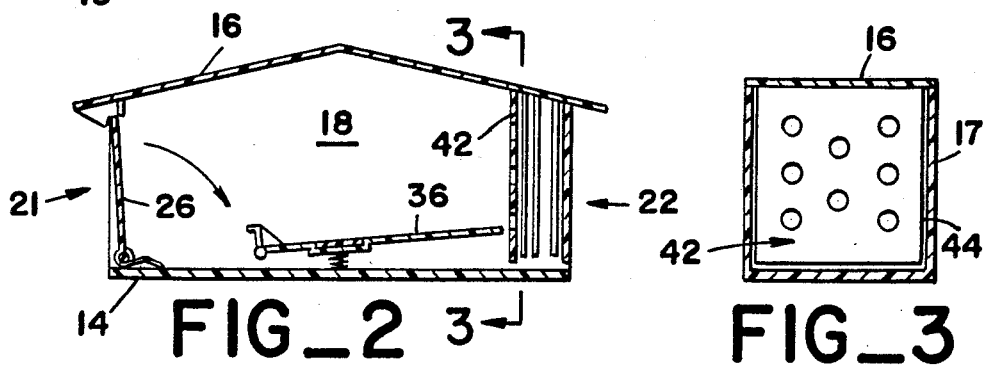
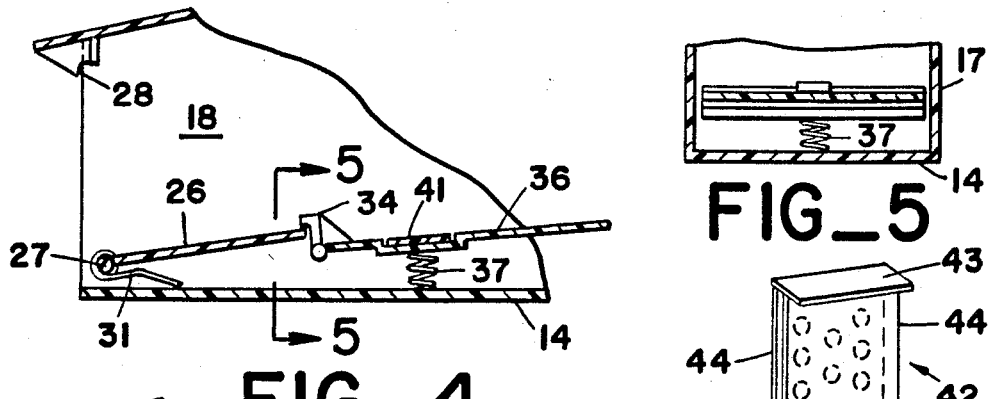
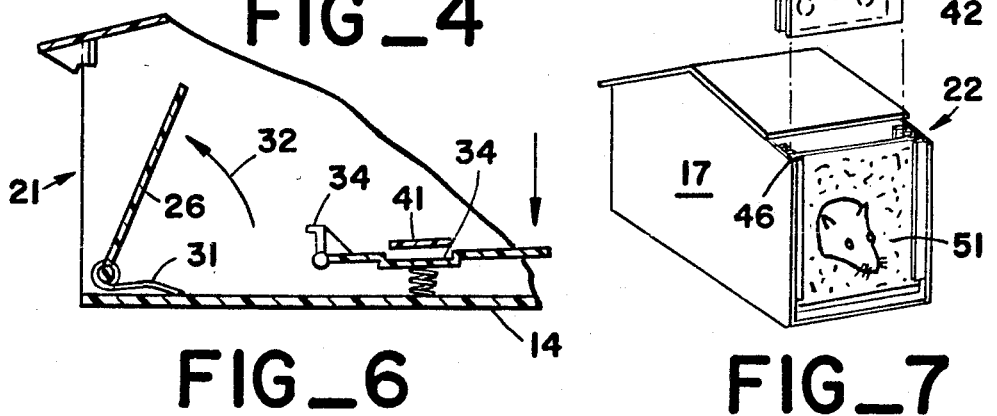

ANIMAL TRAP

BACKGROUND OF THE INVENTION

Various forms of humane types of traps have heretofore been utilized in which an animal may be captured in a cage or the like, but without causing death or injury to the animal, as is the case with the conventional spring loaded mousetrap. Typical of such humane types of traps are those disclosed in U.S. Pat. Nos. 86,175; 1,370,327; 2,151,046 and 2,655,129.

Although the prior art traps are capable of capturing the animals in a humane manner, a problem arises as to how and when the animals may be released. After the animal has been trapped and is restrained within the trap enclosure, it is, of course, a relatively simple manner to move the trap with the animal therein to a location where the captor is willing to effect release of the animal. However, in such an event, if the captor merely opens the cage or housing containing the animal, the animal may turn on and bite the captor.

SUMMARY OF THE PRESENT INVENTION

In accordance with the teachings of the present invention, an animal trap is provided which will humanely confine a captured animal within a cage or housing. An edible or chewable member is provided which serves as a time release barrier, so that the animal may gnaw or chew away the barrier to effect its release. However, such a release may take place only when the captor desires to permit the same by furnishing the trap with a non-destructive barrier which serves as a closure or barrier until the captor wishes to give the animal access to the edible or destructible barrier.

The following description will describe a trap particularly designed for use in catching small animals, such as mice; but the concept is equally applicable to large animals as well. Also, as will be later made clear, the specific constructional details about to be described are only illustrative of one form or embodiment of my invention, and are not to be construed as limiting the scope thereof, such scope being limited only by the appended claims.

BRIEF DESCRIPTION OF THE DRAWING

FIG. 1 is a perspective view of the trap of the present invention.

FIG. 2 is a longitudinal cross-sectional view of the trap, illustrating the parts in their closed position.

FIG. 3 is a cross-sectional view taken in the plane indicated by line 3—3 of FIG. 2.

FIG. 4 is an enlarged view of a portion of FIG. 2, but illustrating the inlet in an open position.

FIG. 5 is a cross-sectional view taken in the plane indicated by line 5—5 of FIG. 4.

FIG. 6 is a view similar to FIG. 4, but illustrating the inlet barrier in a released position.

FIG. 7 is an expanded perspective view of the exit portion of the trap.

DESCRIPTION OF THE PREFERRED EMBODIMENT

The trap 11 of the present invention is best illustrated in FIG. 1 of the drawing, and is shown positioned against a wall opening 12 through which a mouse 13 or other small animal may appear. For larger animals, the trap might well take on different structural details in addition to being of a larger size. Trap 11 includes a bottom 14, a top 16, and opposed sidewalls 17 which generally define a chamber 18 having an inlet opening 21 at one end of the chamber and an exit or outlet opening 22 at the other end thereof. At least some, and preferably all of the housing members are transparent or may consist of bars, grids, or open meshwork, whereby the captor can determine whether an animal has been trapped in the manner about to be described. Also, although the inlet and outlet are shown as two discrete openings, a simple opening could be utilized for both functions.

Means are provided for releasably closing the inlet opening 21 after the animal has entered chamber 18. As here shown, a door or barrier 26, having a shape complementary to that of opening 21, is pivotally mounted on sidewalls 17 adjacent the bottom 14 by means of a pivot pin 27. This permits pivotal movement of door 26 between a first position as illustrated in FIGS. 1 and 4 in which the door overlies the housing bottom and leaves inlet 21 open, and a second position as illustrated in FIG. 2 in which the door moves to a generally vertical position defining an end wall or barrier to the chamber and closing the opening. A portion 28 of the housing serves as a stop to prevent the door from swinging outwardly and past a vertical orientation. It will be apparent to those skilled in the art that in place of the spring loaded door, a pit fall, a one way door, or a gravity operated door could likewise be utilized.

The door 26 is normally urged into its closed or second position by a torsion spring 31 which urges the door in the direction of arrow 32 so as to provide a barrier or closure for the inlet end of chamber 18. However, in order to provide access to an animal in the chamber, door 26 can be releasably held in its open position by means of a hook-like detent 34 which may overlie the edge of the door remote from its pivot 27. Such a position is shown in FIG. 4 of the drawings. Detent 34 is provided at an end of a generally horizontal platform 36 positioned adjacent the housing bottom and mounted on a single coil spring 37. As illustrated in FIG. 4, the geometry of the parts and the respective strength of springs 31 and 37 is such that door 26 and platform 36 may be manually set to releasably hold the door in its open position.

Platform 36 may be baited in any desired manner, such as by forming a recess 39 on the upper surface thereof in which bait 41 may be positioned to attract the animal 13. When the animal enters through opening 21 to seek the bait, its weight on platform 36 will compress spring 37, causing a release of detent 34, and a resulting quick snapping shut of the door 26. Such movement is shown in an intermediate position in FIG. 6 and in the completed position in FIG. 2.

The outlet end 22 of the chamber is provided with a closure or barrier 42 which has a shape and is of a size to block the outlet when properly positioned in the housing. The barrier 42 may include a flange portion 43 which lies in the plane of the top wall and side edges 44 which slidably engage slots 46 or the like provided in the sidewalls. In this manner, the closure may be used to prevent escape of the trapped animal, as shown in FIGS. 1 and 2, and removed, as shown in FIG. 7, which would normally permit the animal to escape through the outlet opening. As previously explained, it is not essential that barrier 42 is formed separately of barrier 26, since it would be possible to use a single barrier which would close in some fashion when the animal enters the trap, and which could be raised, pivoted, or otherwise removed so as to permit the animal to escape.

However, if the user of the trap merely lifts the barrier 42, the animal might attack its captor. It is for this reason that a further barrier 51 is provided. Thus, after the animal has been trapped, barriers 26 and 42 (if both barriers are used) will effectively prevent escape of the animal. The trap can then be safely transported to an area where the person desires to permit the animal to escape. When in this area, the third barrier 51 comes into play. This third barrier generally blocks the outlet and has a planar configuration substantially similar to that of barrier 42. It, likewise, may be formed to provide side edges receivable in suitable slots provided in the housing adjacent to and outboard of the barrier slots 46. Barrier 51 may consist of a cracker or crackers or other edible food. When the barrier 42 is removed by the captor the only item blocking the exit will be the edible barrier 51, and during the time that the animal is chewing, eating or clawing his way through the barrier, the person may remove himself from the immediate vicinity of the trap, and avoid direct confrontation with the released animal. Barrier 51 could alternatively be incorporated in a sliding door with barrier 42 so that one or the other would block the exit opening. A revolving disc would serve also the same purpose.

It should be understood that in accordance with the teachings of this invention, where the terms edible or chewable barrier are used, it is intended to include material which may not be physically eaten by the animal, but which may be clawed or gnawed at by the animal to obtain his release. It is also within the teachings of this invention that the frangible or chewable barrier 51 may be utilized to operate a linkage to effect the opening of the regular barrier 42.

I claim:

1. An animal trap, including a housing defining a chamber, means defining at least one opening in said housing in communication with said chamber, barrier means positioned on said housing at said opening and movable between a first position in which said opening is open and a second position in which said opening is closed, and means for supporting an edible or chewable barrier member on said housing closing said opening and permitting a trapped animal to escape through said opening when said barrier means is in said first open position and when said barrier member is eaten or clawed through.

2. A trap as set forth in claim 1 in which the chamber in said housing is visible from exteriorly of said housing.

3. A trap as set forth in claim 1 including a pair of openings in said housing communicating with said chamber, said barrier means including a first barrier at one of said openings and a second barrier at the other of said openings and each movable between open and closed positions.

4. A trap as set forth in claim 3 in which substantially the entire housing and said first and second barrier are transparent.

5. A trap as set forth in claim 3 in which said first barrier is pivotally mounted on said housing adjacent the bottom of said housing, and such first barrier is pivotally movable from said first open position generally overlying said housing bottom to a second position closing said inlet.

6. A trap as set forth in claim 5 including first spring means normally pivoting said first barrier to said second position for closing said opening.

7. A trap as set forth in claim 6 including detent means releasably engageable with said first barrier for releasably holding said first barrier in said first position against the force of said first spring means.

8. A trap as set forth in claim 7 including second spring means positioned between said housing and said detent means whereby the latter is normally urged into locking engagement with said first barrier, said second spring means being operable by the weight of an animal in said housing to release said detent means from said first barrier.

9. A trap as set forth in claim 3 in which said member closes communication between said chamber and one of said openings in the open position of said second barrier until said member is eaten or clawed through.

10. A method for trapping and releasing animals, including providing a housing defining an animal containing chamber wherein said housing has an entry door which is normally open but is movable to a closed position when the animal enters the chamber, and said housing further having an animal release door movable by the user between an open and closed position, and said housing also having an edible release barrier closing said chamber when said release door is open, said method comprising moving the trap to a desired release location when an animal is trapped in the chamber with the entry door and the release door both in a closed position, opening the release door so as to provide communication between the chamber and the edible release barrier, and then permitting the animal to escape from the chamber by eating through the edible release barrier.

* * * * *